United States Patent
Kinnucan, Jr.

(10) Patent No.: US 7,636,887 B1
(45) Date of Patent: Dec. 22, 2009

(54) ADAPTIVE DOCUMENT-BASED ONLINE HELP SYSTEM

(75) Inventor: Paul F. Kinnucan, Jr., Milton, MA (US)

(73) Assignee: The MathWorks, Inc., Natick, MA (US)

( * ) Notice: Subject to any disclaimer, the term of this patent is extended or adjusted under 35 U.S.C. 154(b) by 632 days.

(21) Appl. No.: 11/073,311

(22) Filed: Mar. 4, 2005

(51) Int. Cl.
*G06F 3/00* (2006.01)

(52) U.S. Cl. ............... 715/705; 715/744; 715/749; 715/765

(58) Field of Classification Search ............ 715/705, 715/706, 707, 708, 709, 714, 716, 719, 744, 715/749, 760, 762, 764, 765, 781, 804, 805, 715/810, 866, 205, 221, 222, 234
See application file for complete search history.

(56) References Cited

U.S. PATENT DOCUMENTS

| | | | |
|---|---|---|---|
| 5,655,130 A * | 8/1997 | Dodge et al. | 715/210 |
| 5,953,005 A * | 9/1999 | Liu | 715/243 |
| 6,185,587 B1 * | 2/2001 | Bernardo et al. | 715/234 |
| 6,201,948 B1 * | 3/2001 | Cook et al. | 434/350 |
| 6,300,950 B1 * | 10/2001 | Clark et al. | 715/705 |
| 6,349,307 B1 * | 2/2002 | Chen | 707/103 X |
| 6,738,778 B1 * | 5/2004 | Williamson et al. | 707/101 |
| 7,065,518 B2 | 6/2006 | Nishioka et al. | |
| 7,127,527 B1 * | 10/2006 | Greenwalt et al. | 709/249 |
| 2002/0152245 A1 * | 10/2002 | McCaskey et al. | 707/530 |
| 2004/0102976 A1 * | 5/2004 | Pochueva | 704/270.1 |
| 2004/0172358 A1 * | 9/2004 | Lent et al. | 705/38 |
| 2004/0255234 A1 * | 12/2004 | Methot | 715/500 |
| 2006/0050865 A1 * | 3/2006 | Kortum et al. | 379/265.07 |
| 2006/0085750 A1 * | 4/2006 | Easton et al. | 715/708 |
| 2006/0150151 A1 * | 7/2006 | Dubinsky | 717/114 |

OTHER PUBLICATIONS

Wasson, G., et al. "Adobe® FrameMaker® Template Series. Primer." 1998 Adobe Systems Incorporated, pp. 1-58.
WebWorks®, "WebWorks® ePublisher Pro for FrameMaker," Quadralay Corporation (2005).

* cited by examiner

*Primary Examiner*—X. L Bautista
(74) *Attorney, Agent, or Firm*—Lahive & Cockfield, LLP; Kevin J. Canning (57) ABSTRACT

Methods, systems and mediums are provided for enabling users to obtain help information in an online help system. The online help system utilizes adaptive documents to display help messages requested by the users. The content of the adaptive documents may dynamically vary according to, for example, the user's skill level, associated software products installed on the users' system, additional information that has emerged since the users acquired the software product, e.g., the discovery of defects or the fixing of defects in the program, language of the location where the software environment is provided. The present invention may also provide a publishing system that enables authors to create the adaptive help documents used in the online help system. The present invention therefore provides a complete and efficient online help system using adaptive documents to display various help messages.

25 Claims, 10 Drawing Sheets

ADAPTIVE DOCUMENT-BASED ONLINE HELP SYSTEM

FIELD OF THE INVENTION

The present invention relates generally to an online help system, and more particularly to an adaptive document-based online help system.

BACKGROUND OF THE INVENTION

Many software environments provide help systems for enabling users to obtain help information on programs or software products running in the software environments. If users encounter a problem or forget a command while running the programs, users can invoke the help system by pressing a designated help key or entering a help command. For example, the help key is the function key labeled F1 in Windows®. Once the help system is invoked, users can choose the appropriate topic for the problem that the users are currently encountering. The help system then displays a help screen that contains the desired documentation. Some help systems are more sophisticated, displaying different help messages depending on where the users are in the program. Such systems are said to be context sensitive.

Conventional help systems, including context sensitive help systems, use static help documents the content of which does not vary after installation. Since the content of the static help documents does not vary, the conventional help systems provide separate help documents for different content. It is not an efficient method to provide separate static help documents for help messages that are closely related.

SUMMARY OF THE INVENTION

The present invention provides a software environment in which one or more programs or software products run. In the software environment, an online help system is provided to enable users to obtain help information on the programs. The online help system utilizes adaptive documents to display help messages requested by the users. The content of the adaptive documents may dynamically vary according to, for example, the user's skill level, associated software products installed on the user's system, additional information that has emerged since the user acquired the software product, e.g., the discovery of bugs or the fixing of bugs in the program, language of the location where the software environment is provided. The present invention may also provide a publishing system that enables authors to create the adaptive help documents used in the online help system. The present invention therefore provides a complete and efficient online help system using adaptive documents to display various help messages.

In accordance with one aspect of the present invention, a method is provided for displaying help information for a program running on a computational device. The method includes the step of providing an adaptive document containing the help information for the program including one or more executable objects. The method also includes the step of executing the one or more executable objects to adapt content of the adaptive document to an environment where the program is used.

In accordance with one aspect of the present invention, a system is provided for displaying help information for a program running on a computational device. The system includes an adaptive document containing the help information for the program. The adaptive document includes one or more executable objects. The system also includes a viewer for displaying content of the adaptive document. The viewer executes the one or more executable objects to adapt the content of the adaptive document to an environment where the program is used.

In another aspect of the present invention, a medium is provided for holding instructions executed in a computational device to perform a method for displaying help information for a program running on the computational device. The method includes the step of providing an adaptive document containing the help information for the program including one or more executable objects. The method also includes the step of executing the one or more executable objects to adapt content of the adaptive document to an environment where the program is used.

BRIEF DESCRIPTION OF THE DRAWINGS

The aforementioned features and advantages, and other features and aspects of the present invention, will become better understood with regard to the following description and accompanying drawings, wherein:

FIGS. 5A-6B show exemplary graphical user interfaces provided in the implementation of the illustrative embodiment;

DETAILED DESCRIPTION

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention provides a software environment in which one or more programs or software products are running. In the software environment, an online help system is provided to enable users to obtain help information on the programs or software products. An exemplary software environment can be found in Simulink® from The MathWorks, Inc. of Natick, Mass. The illustrative embodiment will be described for illustrative purposes relative to a Simulink® software environment. Although the illustrative embodiment will be described relative to the Simulink® software environment, one of ordinary skill in the art will appreciate that the present invention may apply to other software environments, such as LabView from National Instruments Corporation of Austin, Tex., Rational Rose from IBM of White Plains, N.Y., and Microsoft Windows.

Simulink® operates on the foundation of MATLAB® from The MathWorks, Inc. of Natick, Mass., and provides tools for modeling and simulating a variety of dynamic systems in one integrated, graphical environment. Simulink® enables users to design a block diagram for a target system, simulate the system's behavior, analyze the performance of the system, and refine the design of the system. Simulink® allows users to design target systems through a user-interface that allows drafting of block diagram models of the target systems. All of the blocks in a block library provided by Simulink® and other programs are available to users when the users are building the block diagram of the target systems. Individual users may be able to customize this model block to: (a) reorganize blocks in some custom format, (b) delete blocks they do not use, and (c) add custom blocks they have designed. The blocks may be dragged through some human-machine interface (such as a mouse or keyboard) from the block library on to the window (i.e., model canvas). Simulink® can be running combined with other programs or software products, such as Real-Time Workshop® (RTW) and RTW Embedded Coder, both from The MathWorks, Inc. of Natick, Mass.

The illustrative embodiment uses adaptive help documents to enable users to obtain help information on the programs or software products running in the software environment. In the illustrative embodiment, the adaptive help documents refer to help documents that use scripts embedded in the help documents themselves to adapt the content of the help documents to a state of the software environment where the programs or software products are running. The help documents may be in the form of dynamic HTML or XML pages in the illustrative embodiment. Those of ordinary skill in the art will appreciate that the help documents may take any other forms in different embodiments.

The content of the adaptive help documents may be varied according to the programs or software products installed in the user's system. For example, the illustrative embodiment may display help documents for Simulink® features whose options depend on which add-on programs or software products are installed and licensed. Simulink® automatically configures itself to display various options, depending on what programs or software product are installed, e.g., Real-Time Workshop® (RTW) and RTW Embedded Coder. The adaptive help documents configure themselves to the programs or software products available on the user's system.

Those of ordinary skill in the art will appreciate that the state of the associated software products installed in the user's system is illustrative and the content of the adaptive help documents can be varied according to other states of the software environment, such as the user skill level, displaying different kinds of information for different types of users, e.g., more tutorial information for novices. The content of the adaptive help documents may also be varied according to information on whether a defect has been detected for a feature for which the user has requested help. Furthermore, the language of the adaptive help documents may be varied according to information on the locations where the programs or software products are used.

The illustrative embodiment may also provide a publishing system for creating the adaptive help documents used in the online help system. The publishing system may provide or enable authors to create a source template that defines the type of the adaptive document and a marker specifying dynamic sections in the adaptive help document. The marker may contain information on the condition under which the dynamic sections are displayed to the users. The publishing system may provide or enable the authors to create a conversion specification for converting a source document created in the publishing system using the source template to the adaptive help document that can be displayed in the online help system.

Figure 1:
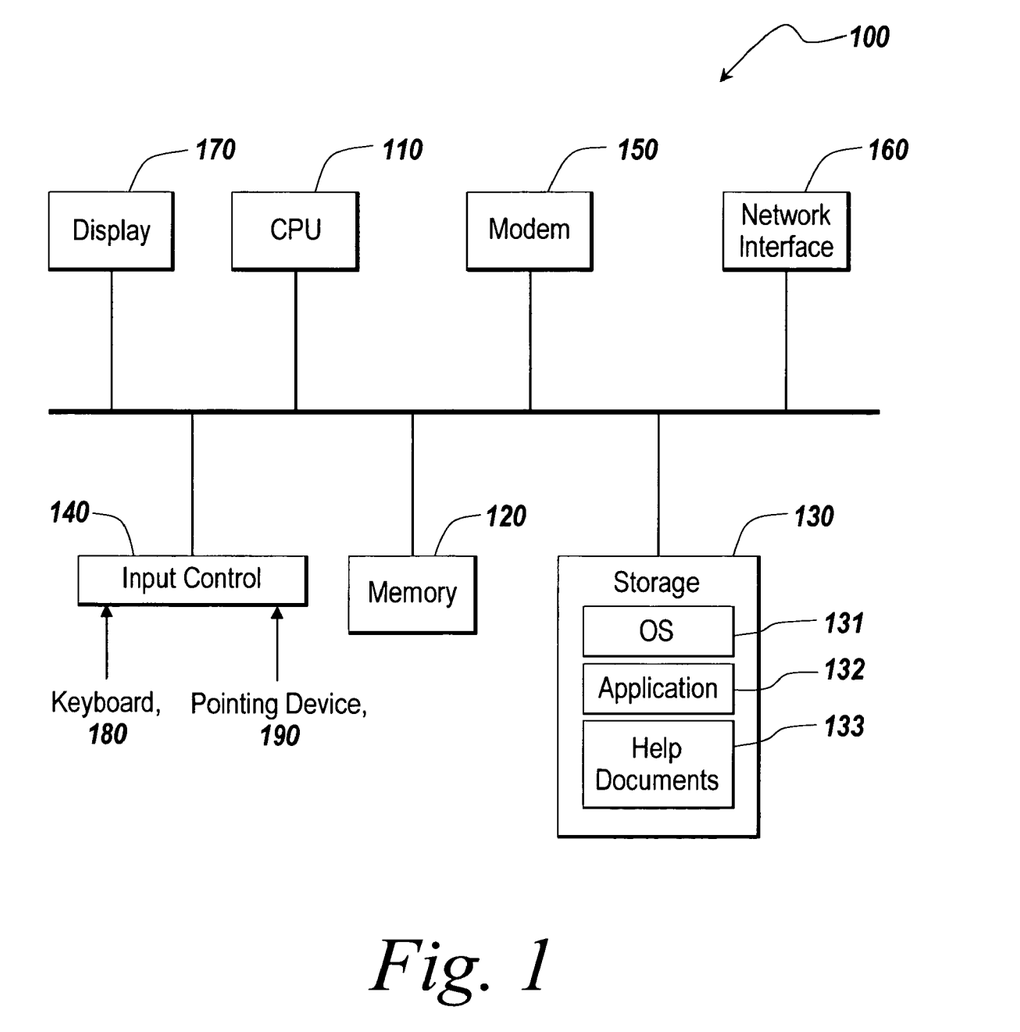
FIG. 1 is an exemplary computational device suitable for practicing the illustrative embodiment of the present invention.

FIG. 1 is an exemplary computational device 100 suitable for practicing the illustrative embodiment of the present invention. One of ordinary skill in the art will appreciate that the computational device 100 is intended to be illustrative and not limiting of the present invention. The computational device 100 may take many forms, including but not limited to a workstation, server, network computer, quantum computer, optical computer, bio computer, Internet appliance, mobile device, a pager, a tablet computer, and the like.

The computational device 100 may be electronic and include a Central Processing Unit (CPU) 110, memory 120, storage 130, an input control 140, a modem 150, a network interface 160, a display 170, etc. The CPU 110 controls each component of the computational device 100 to provide the online help system and/or the publishing system. The memory 120 temporarily stores instructions and data and provides them to the CPU 110 so that the CPU 110 operates the computational device 100. The storage 130 usually contains software tools for applications. The storage 130 may include, in particular, code 131 for the operating system (OS) of the device 100, code 132 for applications running on the operation system including applications for providing the online help system and/or the publishing system, and code 133 for the help documents provided in the illustrative embodiment. In some embodiments of the computational device 100, the operating system 131, application code 132, and the help documents 133 may reside partially or entirely in memory 120 either continually or at various times during the operation of the computational device 100.

The input control 140 may interface with a keyboard 180, a mouse 190, and other input devices. The computational device 100 may receive through the input control 140 input data necessary for creating and/or displaying the adaptive help documents. The computational device 100 may display in the display 170 user interfaces for creating and/or displaying the adaptive help documents.

Figure 2:
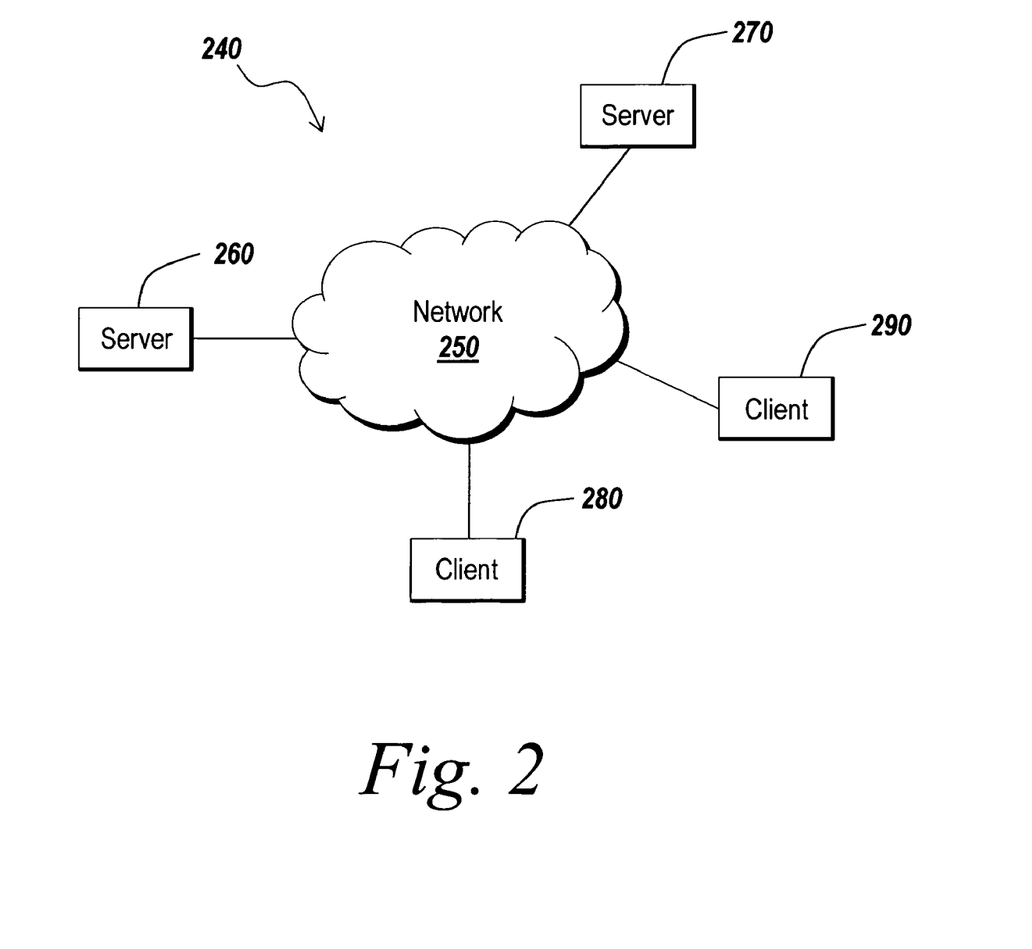
FIG. 2 is an exemplary network environment that enables an online implementation of the present invention.

FIG. 2 is an exemplary network environment 240 suitable for implementing the online system of the illustrative embodiment. The network environment 240 may include one or more servers 260 and 270 coupled to clients 280 and 290 via a communication network 250. The servers 260 and 270 and clients 280 and 290 can be implemented using the computational device 100 depicted in FIG. 1. In some embodiments of a network environment, the same computational device 100 can function both as a server and as a client. The network interface 160 and the modem 150 of the computational device 100 enable the servers 260 and 270 to communicate with the clients 280 and 290 through the communication network 250. The communication network 250 may include Internet, intranet, LAN (Local Area Network), WAN (Wide Area Network), MAN (Metropolitan Area Network), etc. The communication facilities can support the distributed implementations of the present invention. In particular, the clients 280 and 290 or servers 260 and 270 may receive through the network 250 data necessary for creating and/or displaying the adaptive help documents.

In the network environment 240, the servers 260 and 270 may provide the clients 280 and 290 with programs or software products under a particular condition, such as a license agreement. The software products may include an online help system and/or a publishing system. In the online help system, users can obtain help information on the programs or software product running in the clients 280 and 290. When help information is requested from the clients 280 and 290, the servers 260 and 270 may provide help documents to the clients 280 and 290 in response to the request. The publishing system may enable authors to create the help documents.

Figure 3:
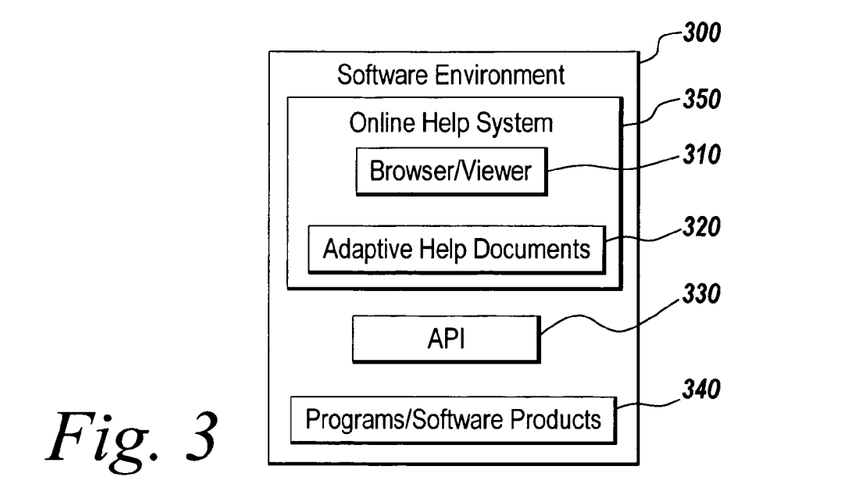
FIG. 3 is an exemplary software environment provided in the illustrative embodiment of the present invention.

FIG. 3 is an exemplary software environment 300 provided in the illustrative embodiment of the present invention. The software environment 300 may include one or more programs or software products 340 installed and licensed to use in the software environment 300. The software environment 300 may include an application program interface (API) 330 that allows adaptive documents 320 to determine the state, attributes, and other information pertaining to the software environment 300. The software environment 300 may provide an online help system 350 that includes a browser/viewer 310 and adaptive help documents 320.

The browser/viewer 310 displays the help documents 320 and is capable of running scripts embedded in the documents 320 as the scripts are encountered in the documents 320. The scripting language supported by the browser/viewer 310 may include a construct for inserting new text into the stream of text displayed by the browser/viewer 310. The scripting language may also include a conditional construct that permits the script to take different execution paths, depending on whether a specified condition is true or false. The scripting language may further include a construct for invoking programs and accessing data external to the browser/viewer 310.

An example of the browser/viewer 310 may be found in MATLAB® Help Browser. MATLAB® Help Browser is a viewer for displaying online help messages for MATLAB® and capable of running JavaScript embedded in HTML documents as the scripts are encountered in the HTML text. The JavaScript language includes a document.write construct that allows a script to insert arbitrary text into the stream of HTML text elements being displayed by the viewer 310 on the user's screen. Standard JavaScript does not include constructs for accessing other programs or data running outside a viewer. However, MATLAB® Help Browser supports extensions to the JavaScript standard called LiveConnect that permits scripts to access external programs and data.

The application programming language (API) 330 enables scripts executed by the viewer 310 to access the internal state of the software environment 300. The API 330 enables scripts running in the viewer 310 to invoke Java methods that return the state, attributes, or other information pertaining to the software environment 300. The information on the state of the software environment 300 may indicate which programs or software products 340 are installed in the software environment 300. One of ordinary skill in the art will appreciate that the API 330 may return information on other states of the software environment, such as the user skill level, locations where the software environment is provided and whether a defect has been detected for a feature for which the user has requested help.

Figure 4:
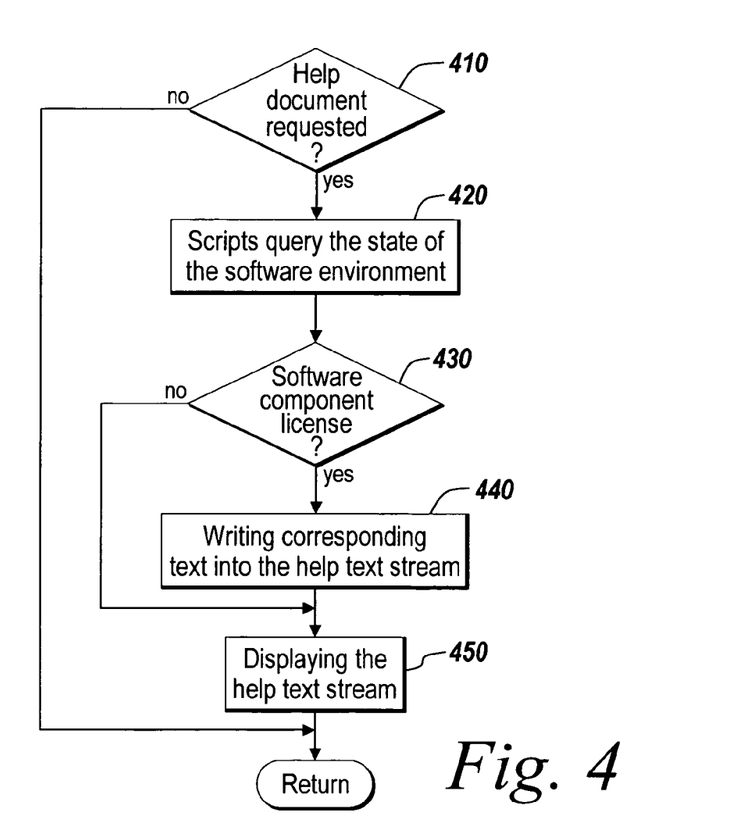
FIG. 4 is a flow chart illustrating an exemplary operation for displaying an adaptive help document.

FIG. 4 is a flow chart illustrating an exemplary operation for displaying the adaptive help document in the software environment 300. If a help document 320 is requested (step 410), a script included in the help document 320 where the document's content depends on the state of the software environment 300 queries the environment 300 as to its state (step 420). The following is an example of an adaptive document containing a script that displays different text depending on whether a user has a license for Real-Time Workshop® (RTW).

<html>
<head><title>Adaptive Document Example</title></head>
<body>
<p>Always appears.</p>
<script language="JavaScript">
var license_exists=
Packages.com.mathworks.mlservices.MLLicenseChecker.hasLicense("Real Time_workshop");
if (license_exists) {
document.write("<p>Appears only when the Real-Time Workshop is installed.</p>");}</script>
</body></html>

This script uses the MLLicenseChecker.hasLicense method, which is part of the MATLAB® API, to check whether the user has a license for Real-Time Workshop® (step 430). The script invokes this method in the following line.

var license_exists=
Packages.com.mathworks.mlservices.MLLicenseChecker.hasLicense("Real-Time_workshop");

The hasLicense method returns a Boolean value of true or false, depending on whether the user has the specified license. The script assigns the returned value to the variable license_exists. If license_exists is true, the script uses the standard JavaScript document.write function to write HTML text ("<p>Appears only when the Real-Time Workshop is installed.</p>") into the HTML stream (step 440) displayed by the viewer.

if (license_exists) {
document.write("<p>Appears only when the Real-Time Workshop is installed.</p>");}

The HTML text written into the HTML stream is displayed by the browser 310 (step 450).

Figure 5A:
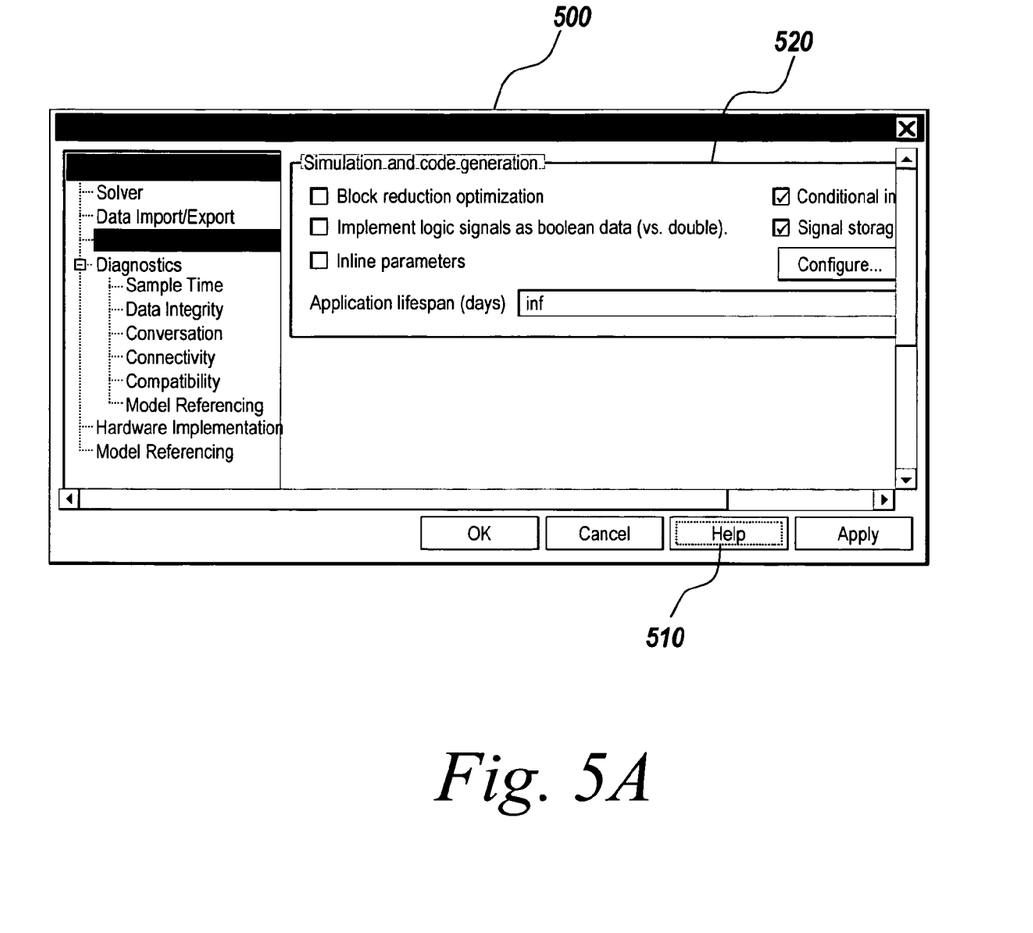

FIGS. 5A-6B show exemplary graphical user interfaces provided in the implementation of the illustrative embodiment. FIG. 5A shows an exemplary user interface 500 for the Optimization pane of the Simulink® Configuration Parameter dialog box. Simulink® has a set of optional software products for use with Simulink®, such as Real-Time Workshop® (RTW). Simulink® determines which software products are licensed to use in the user's system and configures the Simulink® Configuration Parameters dialog box to display various user-selectable options for the installed software products. The Optimization pane 520 of the Configuration Parameters dialog box displays a basic set of options when only Simulink® is installed on a user's system.

Figure 5B:
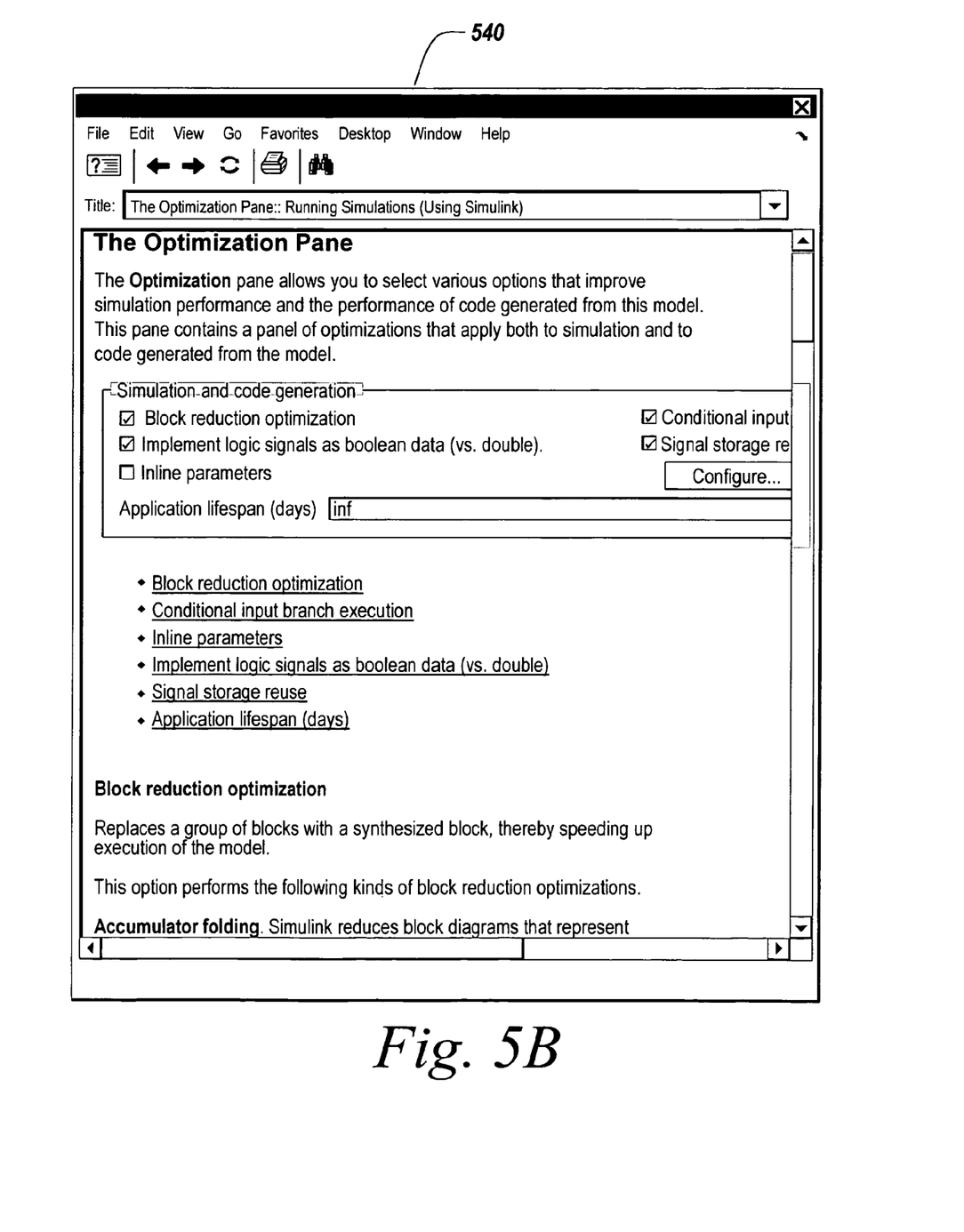

Clicking the Help button 510 on the dialog box displays an adaptive HTML help document 320 in the MATLAB® help browser 310. On being loaded into the browser 310, the adaptive help document 320 with a script embedded as described above determines that only Simulink® is installed and displays information only for the basic set of optimizations for Simulink®. FIG. 5B shows a user interface 540 displaying the top portion of the HTML help document 320 when only Simulink® is installed on the user's system.

Figure 6A:
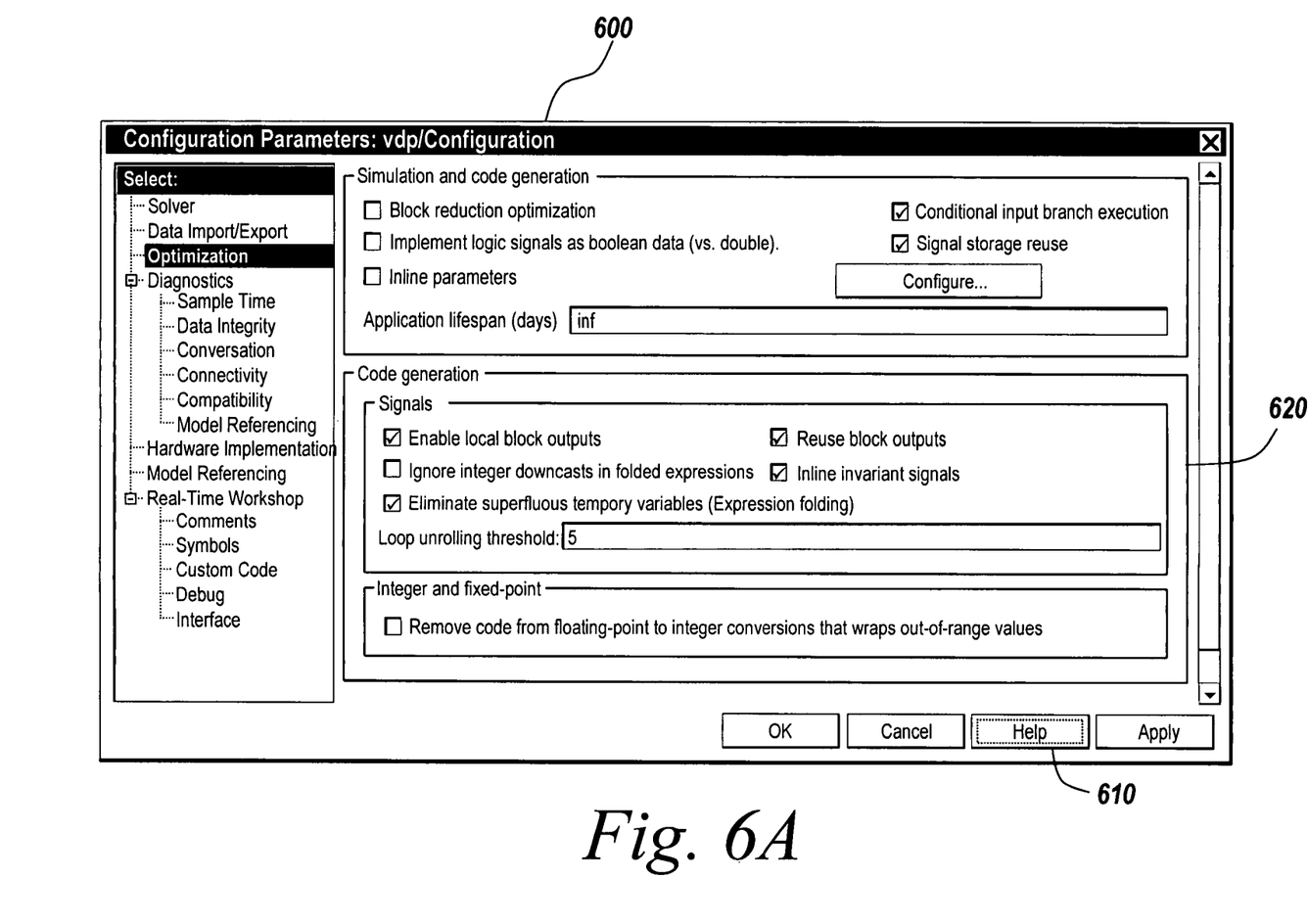

If both Simulink® and Real-Time Workshop® are installed on the user's system, the Optimization pane appears as depicted in FIG. 6A. FIG. 6A shows another exemplary user interface 600 for the Optimization pane of the Simulink® Configuration Parameter dialog box. In the user interface 600, the pane has an additional panel 620 labeled "Code generation" for Real-Time Workshop®. This panel 620 allows the user to select optimizations that apply to code generated from the model using Real-Time Workshop®.

Figure 6B:
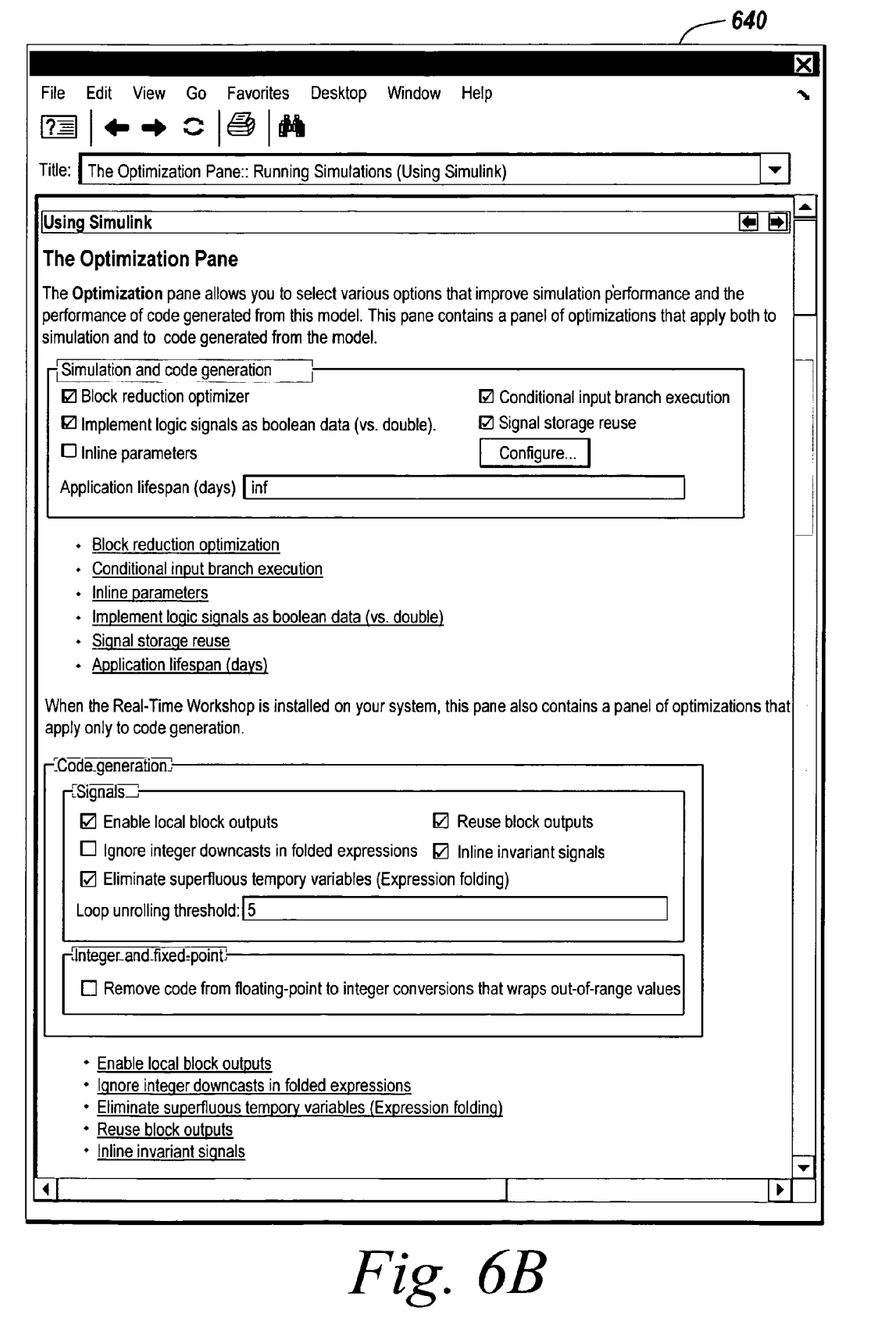

If the user selects the Help button 610 on the pane, Simulink® displays the adaptive help document 320 for the pane in the MATLAB® help browser 310. In this case, a script embedded in the adaptive help document 320 determines that both Simulink® and Real-Time Workshop® are installed on the user's system. The script therefore displays additional information related to the additional optimizations. FIG. 6B is a user interface 640 showing the top portion of an exemplary HTML document as displayed in the help browser 310 when Simulink® and Real-Time Workshop® are installed on the user's system. Comparing FIG. 6B with FIG. 5B shows that the help document now includes a screen capture of the additional code generation panel and hyperlinks to sections of the document that describe those additional options. The sections appear when Real-Time Workshop® is installed on the user's system.

Figure 7:
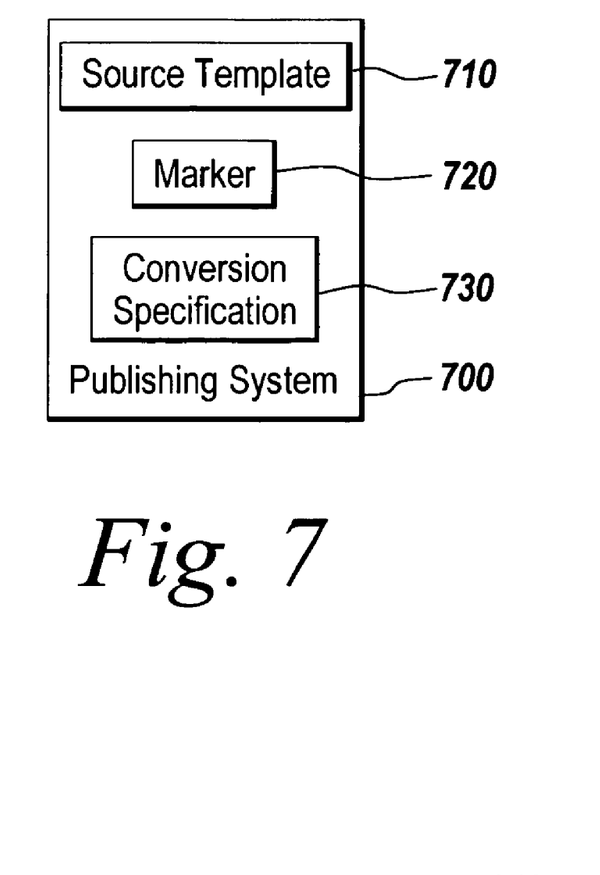
FIG. 7 shows an exemplary publishing system provided in the illustrative embodiment.

The illustrative embodiment may also provide a publishing system for enabling authors to create the adaptive help document utilized in the online help system. FIG. 7 shows an exemplary publishing system 700 provided in the illustrative embodiment. The publishing system 700 may include or enable the authors to create a source template 710, a conversion template 720, and a marker 720. One of ordinary skill in the art will appreciate that the publishing system 700 is illustrative and the elements of the publishing system 700 may be different in other publishing systems.

The source template 710 serves as a master for creating a specific class of documents. The source template 710 may define the type of the documents and include information for the documents, such as the specific types of document elements and their attributes. The source template 710 is used by authors to create new instances of that class of documents, which is referred to as source documents in the description of the illustrative embodiment.

A marker 720 is a delimiter that allows authors to identify contingent sections in a document. Authors are free to define different types of markers to suit various needs. Authors can define custom markers for a specific class of documents and store the marker definitions in the template 710 for that class of documents.

The conversion specification 730 may transform any type of source documents created using the source template 710 in the publishing systems 700 into the adaptive document 320 capable of being displayed on the adaptive document viewer 310. The conversion specification 730 may be a file that contains information needed to convert a document that is an instance of a specific source template to an HTML document. The conversion specification 730 may specify how to convert the formats specified in the source template 710 to a corresponding HTML format.

An exemplary publishing system can be found in FrameMaker, from Adobe Systems, Inc. of San Jose, Calif. FrameMaker allows authors to create master documents, called templates, that define the stylistic elements of a specific type of document, such as a user manual. The template can define tags, called markers, that can be used to indicate the beginning and end of sections of a document and that can contain any text, including text that identifies the section that follows or precedes the marker. FrameMaker allows users to create documents based on templates and to insert tags defined by the templates anywhere in a document and to enter text into the tags. FrameMaker is available with a product, called WebWorks Publisher, that transforms source documents from FrameMaker's native format to HTML format. WebWorks Publisher allows an author to create conversion specifications 730, called templates that define how elements of the source document, including marker, are mapped into elements of the output HTML document.

The illustrative embodiment will be described solely for illustrative purposes relative to FrameMaker. Although the illustrative embodiment will be described relative to the FrameMaker, one of ordinary skill in the art will appreciate that the present invention may use other publishing systems. Another exemplary publishing system may be any publishing system based on the XML standard markup language or the SGML standard from which XML is derived. XML-based systems, for example, allow authors to define master documents, called document type definitions (DTDs) or schemas, that define the structural elements of a specific type of document, such as a software user's guide, where the structural elements are indicated by tags at the beginning and end of sections of text in the document. XML-based publishing systems include editors that allow an author to create elements specific to a type of document and include transformation engines for transforming specific types of XML documents into other types of documents. These transformation engines enable users to define style sheets that specify how to map elements of the XML source documents to elements of the output document.

Figure 8:
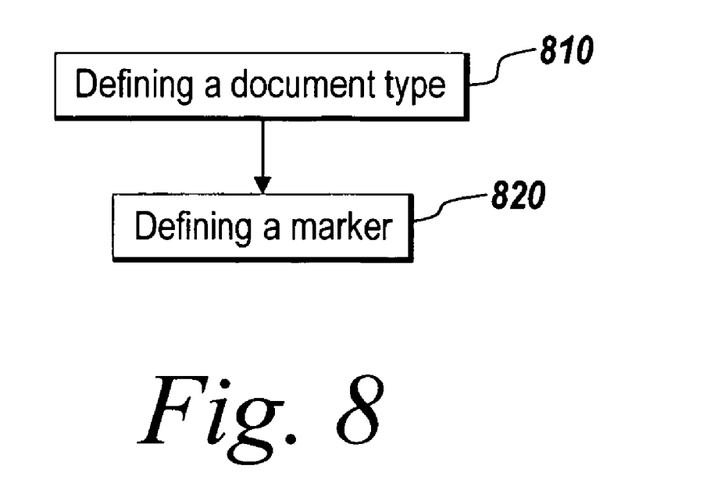
FIG. 8 is flow chart showing an exemplary operation for generating a source template in the illustrative embodiment.

FIG. 8 is a flow chart showing an exemplary operation for generating the source template 710 in the illustrative embodiment. The creation of the source template 710 involves specifying the text format styles of the documents (step 810) and defining the marker 720 for indicating the dynamic sections in the documents (step 820). The marker 720 may include beginning and end markers for indicating the start and end points of a dynamic section, respectively. In addition to indicating the start and end points of a dynamic section, the marker 720 also specifies the conditions under which the dynamic section is displayed to the users.

Figure 9:
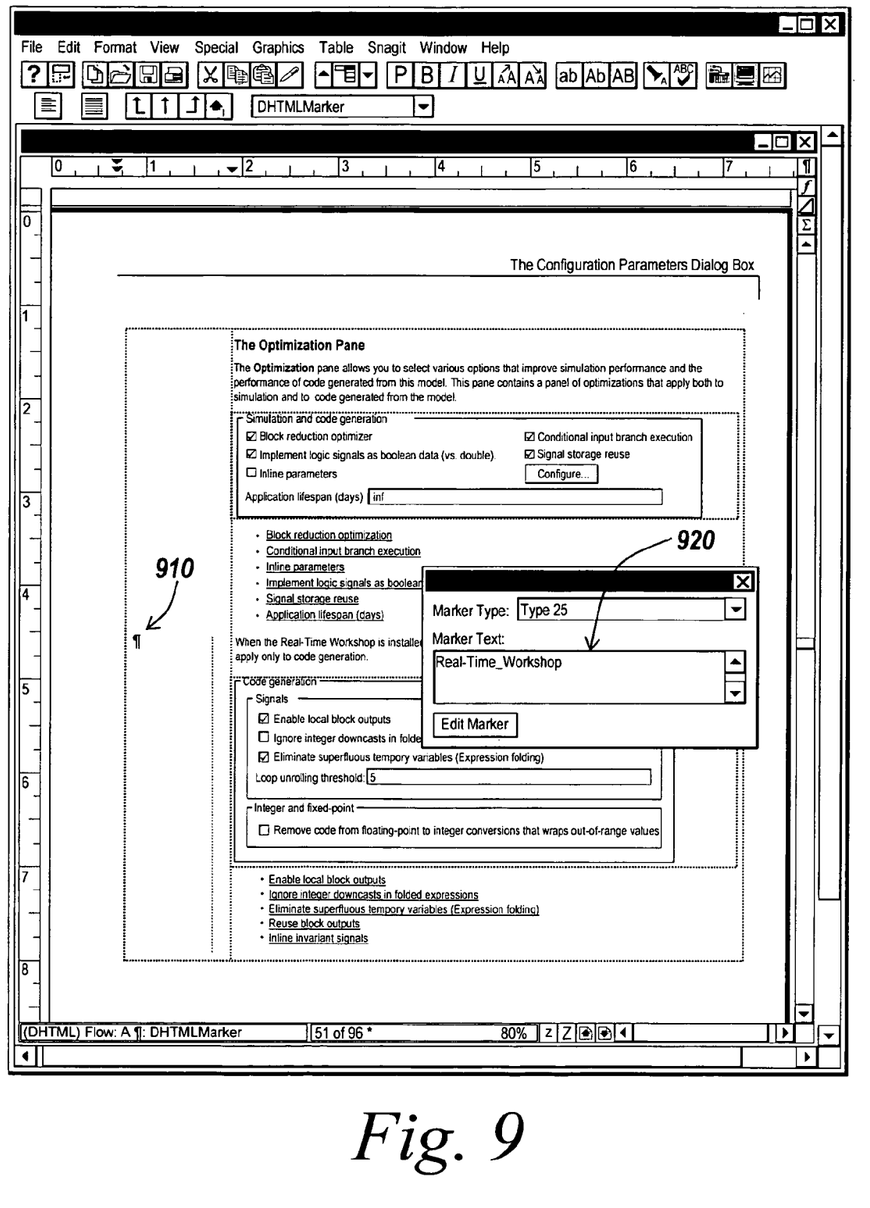
FIG. 9 shows an exemplary marker for marking the beginning of a dynamic section in a source document.

For example, an author using FrameMaker may define two types of custom markers including a Type 25 marker that indicates the start point of a dynamic section and a Type 26 marker that defines the end point of the section. The content of the Type 25 marker may indicate the conditions under which the section is displayed. In particular, when inserting the marker in a document, the authors may specify the license ID of the product to which the dynamic section applies to indicate that the section is displayed when the product is installed. FIG. 9 shows the use of a Type 25 marker 910 to mark the beginning of a dynamic section in the source document used to generate the adaptive help page for the Simulink® Optimizations pane. The authors may specify the license ID 920 of Real-Time Workshop® the product to which the dynamic section applies to indicate that the section is displayed if the product is installed.

Figure 10:
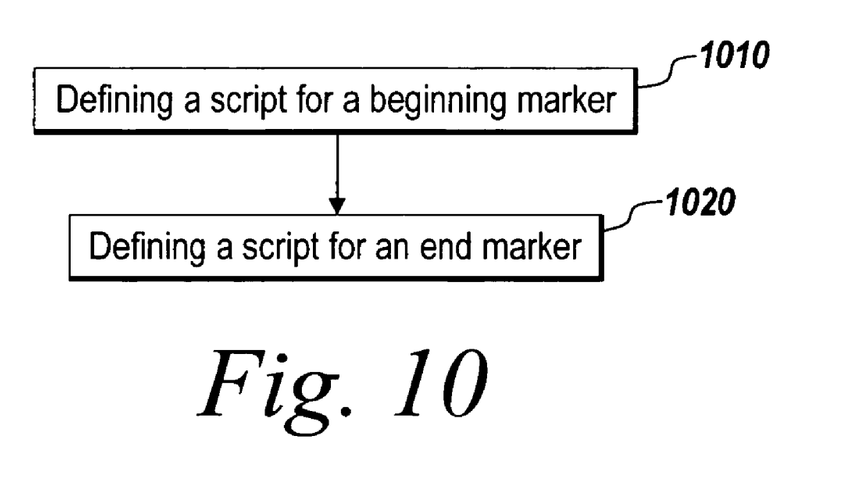
FIG. 10 is flow chart showing an exemplary operation for generating a conversion specification in the illustrative embodiment.

FIG. 10 is a flow chart showing an exemplary operation for generating the conversion specification 730 in the illustrative embodiment. The conversion specification 730 maps the source document to the adaptive document used by the adaptive document viewer. Creating the conversion specification 730 entails defining HTML outputs that correspond to a specific type of objects in the source document, such as a marker of a certain type. The conversion specification 730 may map dynamic sections marked with the marker in the source document to scripts in the adaptive document.

The illustrative embodiment defines a conversion specification 730 that is able to handle the markers indicating the beginning and end points of a dynamic section. The conversion specification 730 may embed the section between the beginning and end markers in a JavaScript object that will display the section when the environment meets a condition specified by the marker. To that end, the illustrative embodiment creates a conversion specification 730 that produce a JavaScript "prolog" when it encounters the beginning marker in the source document (step 1010) and a JavaScript "epilog" when it encounters an end marker in the source document (step 1020).

For example, the following is the prolog specified in the conversion specification 730 used to produce the adaptive HTML page for the Simulink® Optimization pane example described above.

<script language="JavaScript">
    var license_exists=
    Packages.com.mathworks.mlser-
       vices.MLLicenseChecker.hasLicense("$DATA;");
    if (license_exists) {
    document.write("<!--dhtml-->

The conversion specification 730 produces this prolog when it encounters a Type 25 marker in a source document, replacing the variable named $DATA; with the content of the marker. The following is an example of an epilog defined in the same template:

<!—/dhtml—>");}</script>

Figure 11:
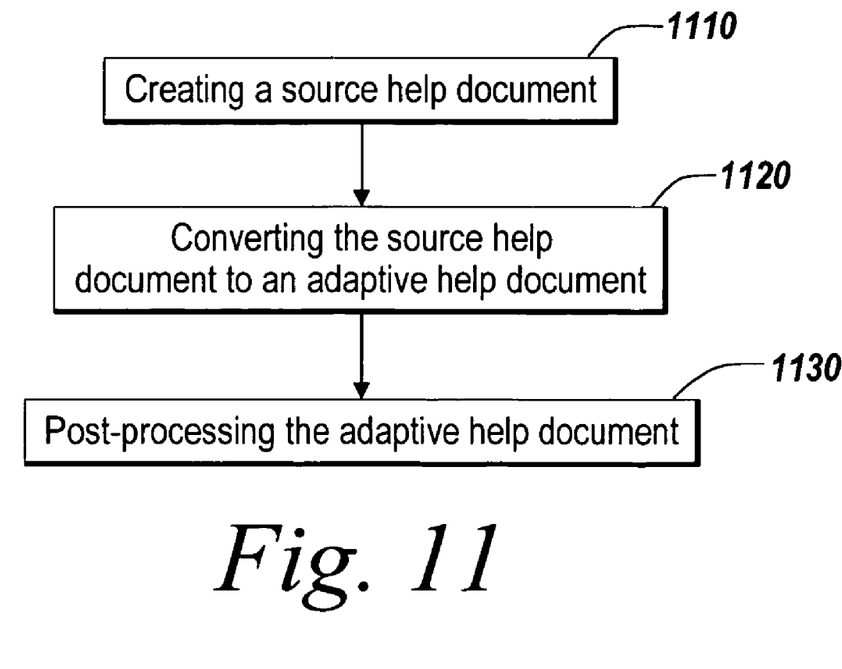
FIG. 11 is a flow chart showing an exemplary operation of the publishing system for converting the source document to an adaptive document.

FIG. 11 is a flow chart showing an exemplary operation of the publishing system 700 for converting a source document to an adaptive document using the conversion specification 730 described above. The authors may create a source document using the source template 710 and the marker 720 (step 1110). For example, suppose that the source document embeds the following text between beginning and end markers.

Appears only when the Real-Time Workshop® is installed.

Then the conversion specification 730 embeds the following JavaScript at the point in the HTML output document corresponding to the dynamic section in the source document (step 1120).

<script language="JavaScript">
    var license_exists=
    Packages.com.mathworks.mlser-
       vices.MLLicenseChecker.hasLicense("Real-Time_workshop");
    if (license_exists) {
    document.write("<!--dhtml--><p>Appears only when the Real-Time Workshop is installed,</p><!--/dhtml-->");}</script>

The use of prolog and epilog script fragments is specific to this illustrative embodiment of an adaptive document publishing systems and is necessitated by the fact that the conversion specification 730 does not support lookahead. Other publishing systems, such as XML, whose conversion specification 730 does support lookahead may permit single-step generation of executable objects representing dynamic sections in adaptive documents.

In some instances, the HTML pages generated by the conversion specification 730 are post-processed to escape special characters, such as quotation marks, in the embedded scripts (step 1130). This is necessary to avoid confusing the browser's JavaScript interpreter when it displays an adaptive document.

For example, there are HTML comments <!--dhtml--> and ><!--/dhtml--> in the HTML output described above. These are pseudo HTML start and end tags inserted to address a potential problem with this implementation of adaptive documents. The problem is how to handle special characters, such as quotation marks, in the HTML embedded in the JavaScript. The dynamic text is generated as a JavaScript string between quotation marks. JavaScript uses quotation marks to indicate the beginning and end of strings. Thus, because dynamic text is generated by the conversion specification 730 as a string, any quotation marks in the generated text may be interpreted by the browser's JavaScript interpreter as a string delimiter, causing the script to fail.

JavaScript can correctly process quotation marks and other special characters embedded in a string if they are preceded by the JavaScript escape character (\). Thus, a way to avoid this problem is to use a postprocessor to escape quotation markers and other special characters in the generated HTML. To facilitate this kind of post processing, the conversion specification 730 may insert pseudo HTML start and end tags around the dynamic text. This enables a postprocessor to easily determine sections of the generated output in which quotation marks and other special characters need to be escaped or removed. The post-process is specific to a FrameMaker based implementation of adaptive documents and may not be necessary in other publishing systems, such as XML-based publishing systems.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. For example, the illustrative embodiment of the present invention may be practiced in any software environment that provides a help system. Practitioners of the art will realize that the sequence of steps and architectures depicted in the figures may be altered without departing from the scope of the present invention and that the illustrations contained herein are singular examples of a multitude of possible depictions of the present invention.

I claim:

1. In a computational device, a method for displaying help information for a program running on the computational device, the method comprising the steps of:
    providing an adaptive document containing the help information for the program, the adaptive document including one or more executable objects;
    in response to a user's request for the help information, executing the one or more executable objects to adapt content of the adaptive document based on the state, attributes, and/or other information pertaining to the environment where the program is used, wherein the one or more executable objects determine to display a first portion of the help information based on the environment where the program is used and determine not to display a second portion of the help information based on the environment where the program is used; and
    displaying the first portion of the help information determined by the one or more executable objects of the adaptive document.

2. The method of claim 1, wherein the adaptive document comprises one of an HTML document and an XML document.

3. The method of claim 1, wherein an executable object comprises a script.

4. The method of claim 1, wherein the information pertaining to the environment where the program is used indicates a user skill level.

5. The method of claim 1, wherein the information pertaining to the environment where the program is used indicates software products installed in the device.

6. The method of claim 1, wherein the information pertaining to the environment where the program is used indicates a state of the program.

7. The method of claim 1, wherein the information pertaining to the environment where the program is used indicates a location where the program is used.

8. The method of claim 7, wherein the information pertaining to the environment where the program is used is used to adapt a language of the help document.

9. The method of claim 1, wherein the step of providing an adaptive document comprises the step of:
providing a document template defining a type of the adaptive document and a marker for designating a portion of the adaptive document that is to be adapted according to the environment.

10. The method of claim 9, wherein the marker comprises information on a condition for adapting the portion of the adaptive document.

11. The method of claim 9, wherein the step of providing an adaptive document comprises the step of:
enabling authors to create a source document using the document template including the marker, wherein the source document includes text for the help information.

12. The method of claim 11, wherein the step of providing an adaptive document comprises the step of:
converting the source document to the adaptive document, wherein the marker is converted to the executable object.

13. A system for displaying help information for a program running on a computational device, the system comprising:
an adaptive document containing the help information for the program, the adaptive document including one or more executable objects; and
a viewer for displaying content of the adaptive document, wherein, in response to a user's request for the help information, the viewer executes the one or more executable objects to adapt the content of the adaptive document based on information about an environment where the program is used, wherein the one or more executable objects determine to display a first portion of the help information based on the environment where the program is used and determine not to display a second portion of the help information based on the environment where the program is used.

14. The system of claim 13, wherein the adaptive document comprises one of an HTML document and an XML document.

15. The system of claim 13, wherein the executable object comprises a script.

16. The system of claim 13, further comprising an application program interface (API) for providing the information.

17. The system of claim 16, wherein the information pertaining to the environment where the program is used indicates a user skill level.

18. The system of claim 16, wherein the information pertaining to the environment where the program is used indicates software products installed in the device.

19. The system of claim 16, wherein the information pertaining to the environment where the program is used indicates a state of the program.

20. The system of claim 16, wherein the information pertaining to the environment where the program is used indicates a location where the program is used.

21. The system of claim 20, wherein the information pertaining to the environment where the program is used is used to adapt a language of the help document.

22. The system of claim 13, further comprising:
a document template for defining a type of the adaptive document; and
a marker for designating a portion of the adaptive document that is to be adapted according to the environment.

23. The system of claim 22, wherein the marker comprises information on a condition for adapting the portion of the adaptive document.

24. The system of claim 22, further comprising:
a source document created by authors using the document template, wherein the source document includes texts for the help information.

25. The system of claim 24, further comprising:
a conversion specification for converting the source document to the adaptive document, wherein the marker is converted to an executable object.

* * * * *